US012712853B2

(12) United States Patent
Xu et al.

(10) Patent No.: US 12,712,853 B2
(45) Date of Patent: Aug. 18, 2026

(54) PER-PORT DATA SECURITY BYPASS FOR NETWORK DEVICES

(71) Applicant: Arista Networks, Inc., Santa Clara, CA (US)

(72) Inventors: Honggang Xu, Richmond (CA); Nathan Wolfe, Burnaby (CA); Basil Saji, Bangalore (IN); Stefan Kheraj, Burnaby (CA); Weicong Li, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 200 days.

(21) Appl. No.: 18/747,674

(22) Filed: Jun. 19, 2024

(65) Prior Publication Data

US 2025/0392620 A1 Dec. 25, 2025

(51) Int. Cl.

| | |
|---|---|
| ***H04J 3/06*** | (2006.01) |
| ***H04L 9/40*** | (2022.01) |
| ***H04L 45/00*** | (2022.01) |
| ***H04L 45/745*** | (2022.01) |
| ***H04L 49/00*** | (2022.01) |
| ***H04L 69/22*** | (2022.01) |
| ***H04L 69/28*** | (2022.01) |

(52) U.S. Cl.

CPC .......... *H04L 63/029* (2013.01); *H04J 3/0667* (2013.01); *H04J 3/0679* (2013.01); *H04L 45/66* (2013.01); *H04L 45/74591* (2022.05); *H04L 49/3009* (2013.01); *H04L 49/3063* (2013.01); *H04L 63/0236* (2013.01); *H04L 63/162* (2013.01); *H04L 63/164* (2013.01); *H04L 69/22* (2013.01); *H04L 69/28* (2013.01); *H04L 2212/00* (2013.01)

(58) Field of Classification Search

CPC ..... H04J 3/0635–0697; H04L 9/40–50; H04L 45/02–851; H04L 47/10–83; H04L 49/10–9094; H04L 63/02–308; H04L 69/02–40; H04L 2212/00

See application file for complete search history.

(56) References Cited

U.S. PATENT DOCUMENTS

| | | | | |
|---|---|---|---|---|
| 2023/0060679 | A1 * | 3/2023 | Pustylnik .......... | H04L 45/74591 |
| 2025/0184110 | A1 * | 6/2025 | Yamamoto .......... | H04L 63/1458 |

* cited by examiner

*Primary Examiner* — Timothy J Weidner
(74) *Attorney, Agent, or Firm* — Fountainhead Law Group, PC

(57) ABSTRACT

Some embodiments provide a method that receives a piece of network data. Based on a set of values in a set of headers of the piece of network data, the method determines whether the piece of network data is precision time protocol (PTP) network data and a particular port in the set of ports of the network device through which the piece of network data is to be forwarded. Based on the particular port, the method determines a port profile from a set of port profiles. Based on a value of the field in the port profile and the determination of whether the piece of network data is PTP network data, the method determines whether to bypass a set of data security operations on the piece of network data. The method transmits the piece of network data through the particular port of the network device.

20 Claims, 6 Drawing Sheets

PER-PORT DATA SECURITY BYPASS FOR NETWORK DEVICES

BACKGROUND

Network devices may include a programmable application-specific integrated circuit (ASIC) chip that can have an on-chip data security engine located between a packet processing pipeline and ports of a network device. Examples of data security engines include a media access control (MAC) security (MACsec) engine, an Internet Protocol (IP) security (IPsec) engine, etc. MACsec and IPsec are network security protocols that provide, among other things, encryption of data transmitted through networks.

Precision Time Protocol (PTP) is a protocol used to synchronize clocks throughout computer networks. PTP is employed where high-accuracy clock synchronization (e.g., sub-microseconds) is desirable. Examples of some applications of PTP include telecommunications, data centers, industrial automation, financial services, broadcasting, etc. In some instances, it may be desirable to configure network devices to not perform data security operations on PTP network data.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for providing per port data security bypass for network devices. In some embodiments, the techniques may be employed to bypass data security operations (e.g., MACsec, IPsec, etc.) on PTP packets. For example, when a network device receives a packet, the network device processes the packet to determine whether the packet is a PTP packet and a port (e.g., an egress port) of the network device through which the packet is to be forwarded out of the network device. If the network device determines that the received packet is a PTP packet, the network device identifies a port profile associated with the port through which the packet is to be forwarded. A port profile can be configured to specify whether to bypass data security operations when forwarding packets out of the port with which the port profile is associated. If the port profile specifies to not bypass data security operations for a port, the network device performs data security operations on the packet, performs PTP operations on the packet, and then forwards the packet out of the port. If the port profile specifies to bypass data security operations for a port, the network device performs PTP operations on the packet and then forwards the packet out of the port without performing any data security operations on the packet.

Figure 1:
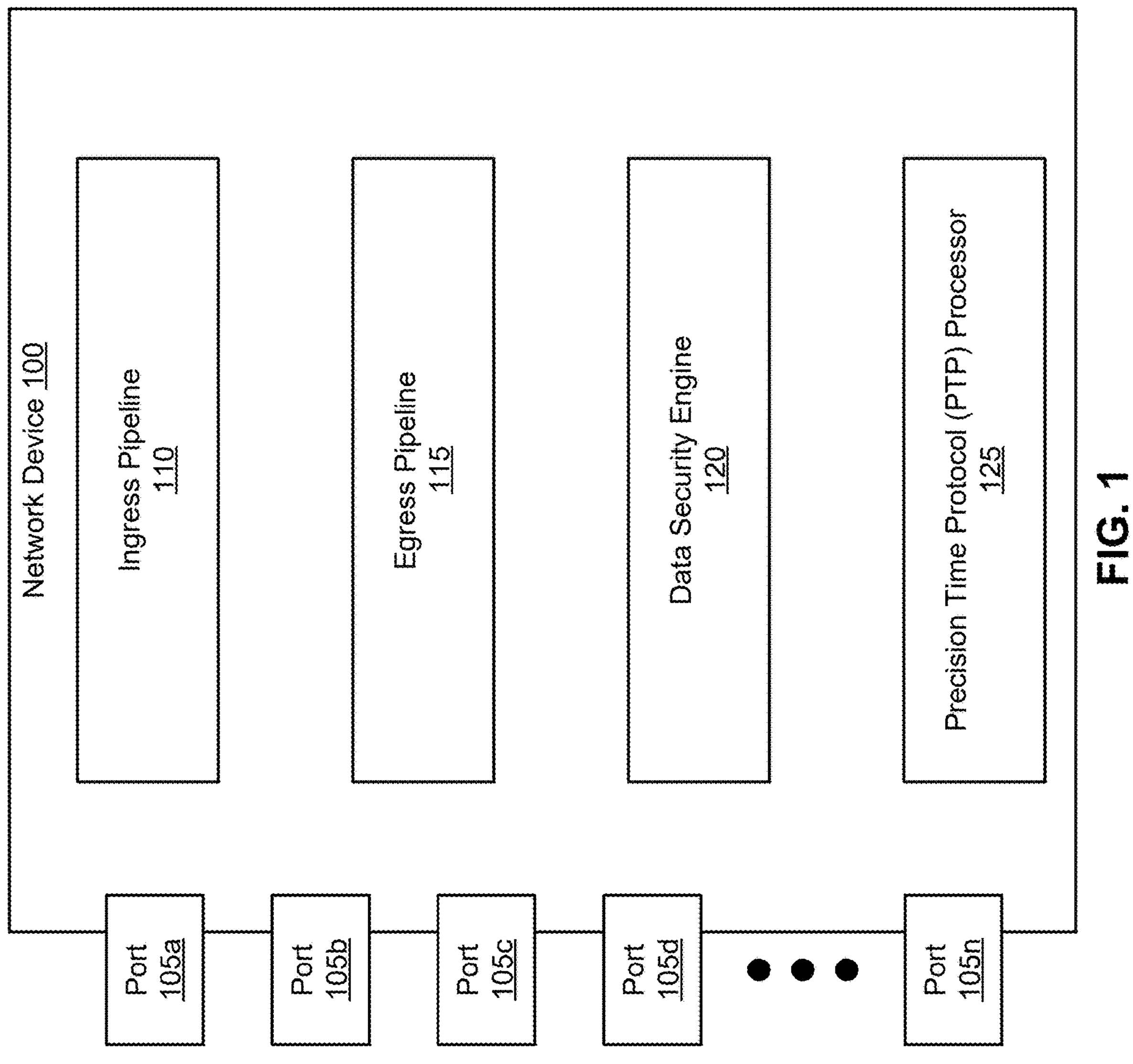
FIG. 1 illustrates a network device that provides per port data security bypass according to some embodiments.

FIG. 1 illustrates a network device 100 (e.g., a router, switch, firewall, and the like) that can be adapted in accordance with the present disclosure that provides per port data security bypass according to some embodiments. As shown, network device 100 includes ports 105*a-n*, ingress pipeline 110, egress pipeline 115, data security engine 120, and PTP processor 125. In some embodiments, ingress pipeline 110, egress pipeline 115, data security engine 120, and PTP processor 125 may be implemented in hardware. For example, each of the ingress pipeline 110, egress pipeline 115, data security engine 120, and PTP processor 125 can be implemented as a set of circuits in an application-specific integrated circuit (ASIC).

Each of the ports 105*a-n* is a physical port communicatively coupled to network device 100 that is configured to communicate network data (e.g., Ethernet frames, IP packets, etc.) from network device 100 to other network devices and vice versa. In some embodiments, ports 105*a-n* can be local area network (LAN) ports.

Ingress pipeline 110 is configured to process network data that network device 100 receives from other network devices via ports 105*a-n*. For instance, when network device 100 receives a piece of network data (e.g., an Ethernet frame, an IP packet, etc.) via one of the ports 105, network device 100 sends the piece of network data to ingress pipeline 110 for processing. Upon receiving the piece of network data, ingress pipeline 110 may determine whether the piece of network data is PTP network data. In some instances, ingress pipeline 110 determines whether the piece of network data is PTP network data by performing a set of lookups on a set of ternary content-addressable memory (TCAM) of network device 100 (not shown). For an Ethernet frame, ingress pipeline 110 determines that the Ethernet frame is a PTP frame if the Ethernet type is reserved for PTP (e.g., 0x88F7). For an IPV4/IPv6 packet, ingress pipeline 110 determines that the IP packet is a PTP packet if the destination UDP port is a UDP port reserved for PTP (e.g., port 319 or 320). If the piece of network data is determined to be PTP network data, this information is captured in internal headers associated with the piece of network data that are transmitted along with the piece of network data to egress pipeline 115.

Next, ingress pipeline 110 determines an egress port for the piece of network data. An egress port is a port 105 through which the piece of network data is to be forwarded out of network device 100 so that the piece of network data can reach its intended destination. In some embodiments, ingress pipeline 110 determines an egress port for the piece of network data by parsing and classifying the piece of network data and determining the forwarding network header of the piece of network data. Ingress pipeline 110 performs lookups in various forwarding databases using fields from the forwarding network header. If a lookup result is found, the lookup result specifies the egress port for the piece of network data. For example, the forwarding network header for a bridged packet can be an Ethernet header. In such cases, ingress pipeline 110 performs lookups in a MAC address table using the destination MAC address in the Ethernet header in order to determine the egress port of the bridged packet. The egress port of the piece of network data is also captured in internal headers associated with the piece of network data that are transmitted along with the piece of network data to egress pipeline 115.

In some embodiments, ingress pipeline 110 may capture the determination that a piece of network data is PTP network data and the egress port of the piece of network data in a set of internal headers by generating a set of headers (i.e., a set of internal headers), storing information (e.g., setting the value of a field in the set of headers to a defined value) indicating that the piece of network data is PTP network data in the set of headers, storing the egress port (e.g., an identifier for identifying the egress port) in the set of headers, and prepend the set of headers to the piece of network data. Ingress pipeline 110 can then transmit this augmented piece of network data to egress pipeline 115.

Egress pipeline 115 is responsible for processing network data for transmission out from network device 100. For instance, upon receiving an augmented piece of network data from ingress pipeline 110, egress pipeline 115 reads the internal headers associated with the piece of network data (e.g., the set of headers prepended to the piece of network data) to identify the egress port for the piece of network data and whether the piece of network data is PTP network data.

Egress pipeline 115 can remove and/or add headers to the piece of network data as appropriate. For example, if network device 100 is configured to perform routing functions, egress pipeline 115 may remove the Ethernet header from the piece of network data and add a new Ethernet header that includes the MAC address of the next hop. If the piece of network data is a tunnel packet, egress pipeline 115 can decapsulate the packet by removing tunnel headers from the packet.

If the piece of network data is PTP network data, egress pipeline 115 reads a port profile associated with the egress port. If the port profile indicates to bypass data security operations, egress pipeline 115 includes instructions in the piece of network data indicating so (e.g., setting a field in a header of the piece of network data to a defined value, such as 0). Otherwise, egress pipeline 115 includes instructions in the piece of network data to not bypass data security operations (e.g., setting a field in a header of the piece of network data to a defined value, such as 1). Egress pipeline 115 may modify the piece of network data so the piece of network data can reach its intended destination. Egress pipeline 115 then sends the piece of network data to data security engine 120.

Data security engine 120 is configured to perform data security operations on network data, for example, by implementing MACsec or IPsec protocols. For example, when data security engine 120 receives a piece of network data from egress pipeline 115, data security engine 120 reads the instructions included in the piece of network data associated with data security. If the instructions indicate to bypass data security operations, data security engine 120 sends the piece of network data to PTP processor 125 without performing any data security operations on the piece of network data. If the instructions indicate to not bypass data security operations, data security engine 120 performs appropriate data security operations on the piece of network data and then sends the piece of network data to PTP processor 125.

PTP processor 125 is responsible for processing PTP network data. For instance, when PTP processor 125 receives a piece of network data from data security engine 120, PTP processor 125 performs appropriate PTP operations on the piece of network data. Then, PTP processor 125 sends the piece of network data out through the determined egress port.

Figure 2:
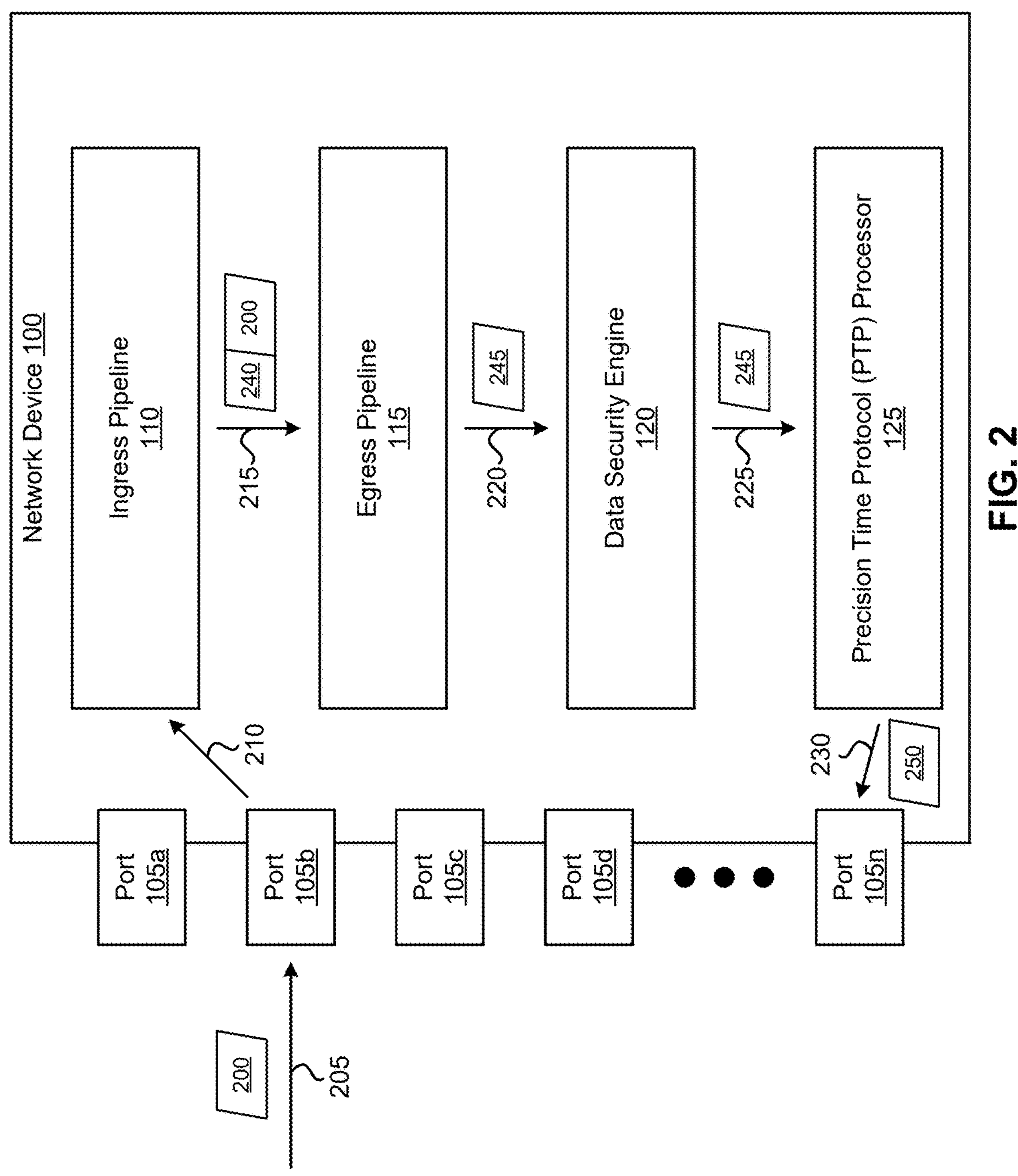
FIG. 2 illustrates an example operation of the network device illustrated in FIG. 1 according to some embodiments.

An example operation will now be described by reference to FIG. 2. FIG. 2 illustrates an example operation of network device 100 according to some embodiments. Specifically, FIG. 2 shows how MACsec operations are bypassed for a PTP Ethernet frame that is processed through network device 100. The example operation begins with network device 100 receiving, at 205, (e.g., from another network device) Ethernet frame 200 via port **105*b*. For this example, Ethernet frame 200** is a PTP Ethernet frame.

Next, port **105*b* sends, at 210, Ethernet frame 200 to ingress pipeline 110. In response to receiving Ethernet frame 200, ingress pipeline 110 determines whether Ethernet frame 200 is a PTP frame. Here, ingress pipeline 110 determines whether Ethernet frame 200 is a PTP frame by performing a set of lookups on a set of TCAMs of network device 100 (not shown) to see if the type field of Ethernet frame 200 is a value reserved for PTP (e.g., 0x88F7). For this example, ingress pipeline 110 determines that Ethernet frame 200 is a PTP frame. Thus, ingress pipeline 110 generates a set of internal headers 240 and stores the determination that Ethernet frame 200 is a PTP frame in the set of internal headers 240 by setting the value of a field in the set of internal headers 240 to a defined value for indicating that Ethernet frame 200** is a PTP frame.

Ingress pipeline 110 then determines an egress port for Ethernet frame 200 by parsing and classifying Ethernet frame 200 and determining the forwarding network header of Ethernet frame 200. For this example, ingress pipeline 110 determines the forwarding header of Ethernet frame 200 is an Ethernet header. As a result, ingress pipeline 110 performs a set of lookups on a MAC address table using the destination MAC address in the Ethernet header of Ethernet frame 200 in order to determine the egress port of the bridged packet. In this example, the determined egress port is port **105*n*. Ingress pipeline 110 stores the egress port (or an identifier for identifying port 105*n*) in the set of internal headers 240 by setting the value of a field in the set of internal headers 240 to a value for identifying the egress port. Next, ingress pipeline 110 prepends the set of internal headers 240 to Ethernet frame 200. Ingress pipeline 110 then transmits, at 215, Ethernet frame 200 with the prepended set of internal headers 240 to egress pipeline 115**.

Once egress pipeline 115 receives Ethernet frame 200 with the prepended set of internal headers 240, egress pipeline 115 reads the set of internal headers 240 to identify the egress port for Ethernet frame 200 and whether Ethernet frame 200 is a PTP frame. Since Ethernet frame 200 is a PTP frame, egress pipeline 115 reads a port profile associated with port **105*n*. For this example, the port profile indicates to bypass MACsec operations. Therefore, egress pipeline 115 includes a set of instructions in Ethernet frame 200** indicating so by setting a field in a header of Ethernet frame 200 to a defined value (e.g., the value 0). Egress pipeline 115 then modifies the destination MAC address of Ethernet frame 200 so Ethernet frame 200 can reach its intended destination. Egress pipeline 115 then sends, at 220, the modified Ethernet frame 200, represented as Ethernet frame 245, to data security engine 120.

After data security engine 120 receives Ethernet frame 245 from egress pipeline 115, data security engine 120 reads the set of instructions included in Ethernet frame 245 by reading the value of the field in the header of Ethernet frame 200. Here, the set of instructions indicates to bypass MACsec operations. Hence, data security engine 120 sends, at 225, Ethernet frame 245 to PTP processor 125 without performing any MACsec operations on Ethernet frame 245. Upon receiving Ethernet frame 245, PTP processor 125 performs appropriate PTP operations on Ethernet frame 245 to produce modified Ethernet frame 250. Finally, PTP processor 125 forwards, 230, Ethernet frame 250 out through port 105*n*.

Figure 3:
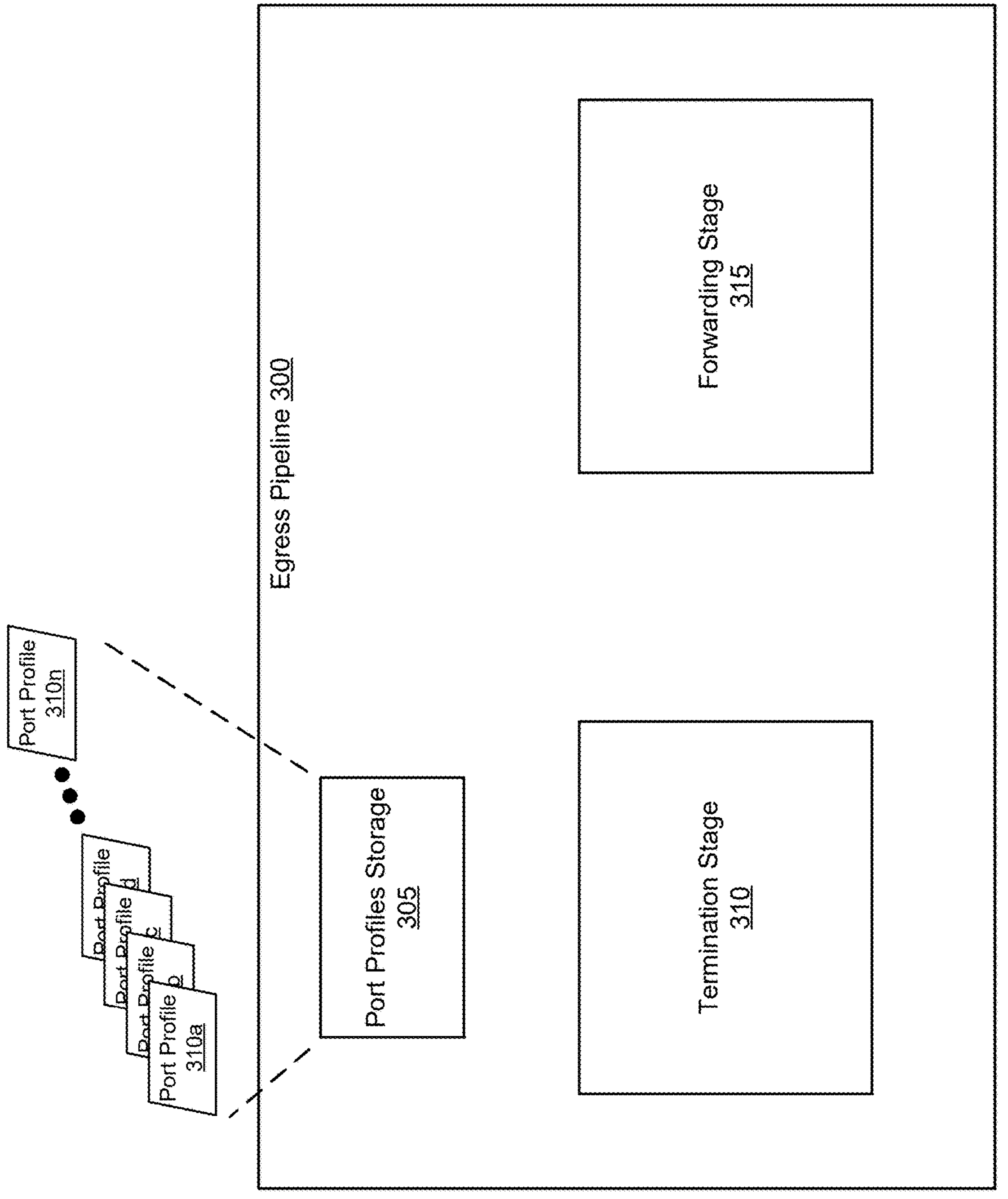
FIG. 3 illustrates an egress pipeline according to some embodiments.

FIG. 3 illustrates an egress pipeline 300 according to some embodiments. In some embodiments, egress pipeline 300 may be used to implement egress pipeline 115. As depicted in FIG. 3, egress pipeline 300 includes port profiles storage 305, termination stage 310, and forwarding stage 315. Port profile storage 305 handles the storage of port profiles. As shown, port profiles storage 305 stores port profiles 310*a*-310*n*. In this example, each port profile 310 is a port profile for a corresponding port 105. In some embodiments, each port profile 310 includes a configurable field for indicating whether to bypass MACsec operations on PTP packets that egress through the corresponding port 105. For example, port profile 310*a* includes a configurable field for indicating whether to bypass MACsec operations on PTP packets that egress through port 105*a*, port profile 310*b* includes a configurable field for indicating whether to bypass MACsec operations on PTP packets that egress through port 105*b*, port profile 310*c* includes a configurable field for indicating whether to bypass MACsec operations on PTP packets that egress through port 105*c*, and so on and so forth.

Termination stage 310 is a stage in egress pipeline 300 for processing network data for transmission out from network device 100. For instance, termination stage 310 handles the removal and/or addition of headers to network data. In addition, termination stage 310 manages the data stored in internal headers of network data. For example, when termination stage 310 receives a piece of network data that has internal headers prepended to it, termination stage 310 reads the determined egress port of the piece of network data and whether the piece of network data is PTP network data from the internal headers. In cases where the piece of network data is PTP network data, termination stage 310 reads a port profile associated with the egress port of the piece of network data. Termination stage 310 sends this information (e.g., whether to bypass data security operations on the piece of network data) along with the piece of network data and the egress port to forwarding stage 315.

Forwarding stage 315 is responsible for preparing network data for egress. For instance, forwarding stage 315 can receive, from termination stage 310, a piece of network data, the egress port of the piece of network data, and information indicating whether to bypass data security operations on the piece of network data. If the information indicates to bypass data security operations on the piece of network data, forwarding stage 315 includes instructions in the piece of network data indicating so (e.g., setting a field in a header of the piece of network data to a particular value). If the information indicates to not bypass data security operations on the piece of network data, forwarding stage 315 includes instructions in the piece of network data to not bypass data security operations. Forwarding stage 315 also modifies the piece of network data so it can reach its intended destination.

Figure 4:
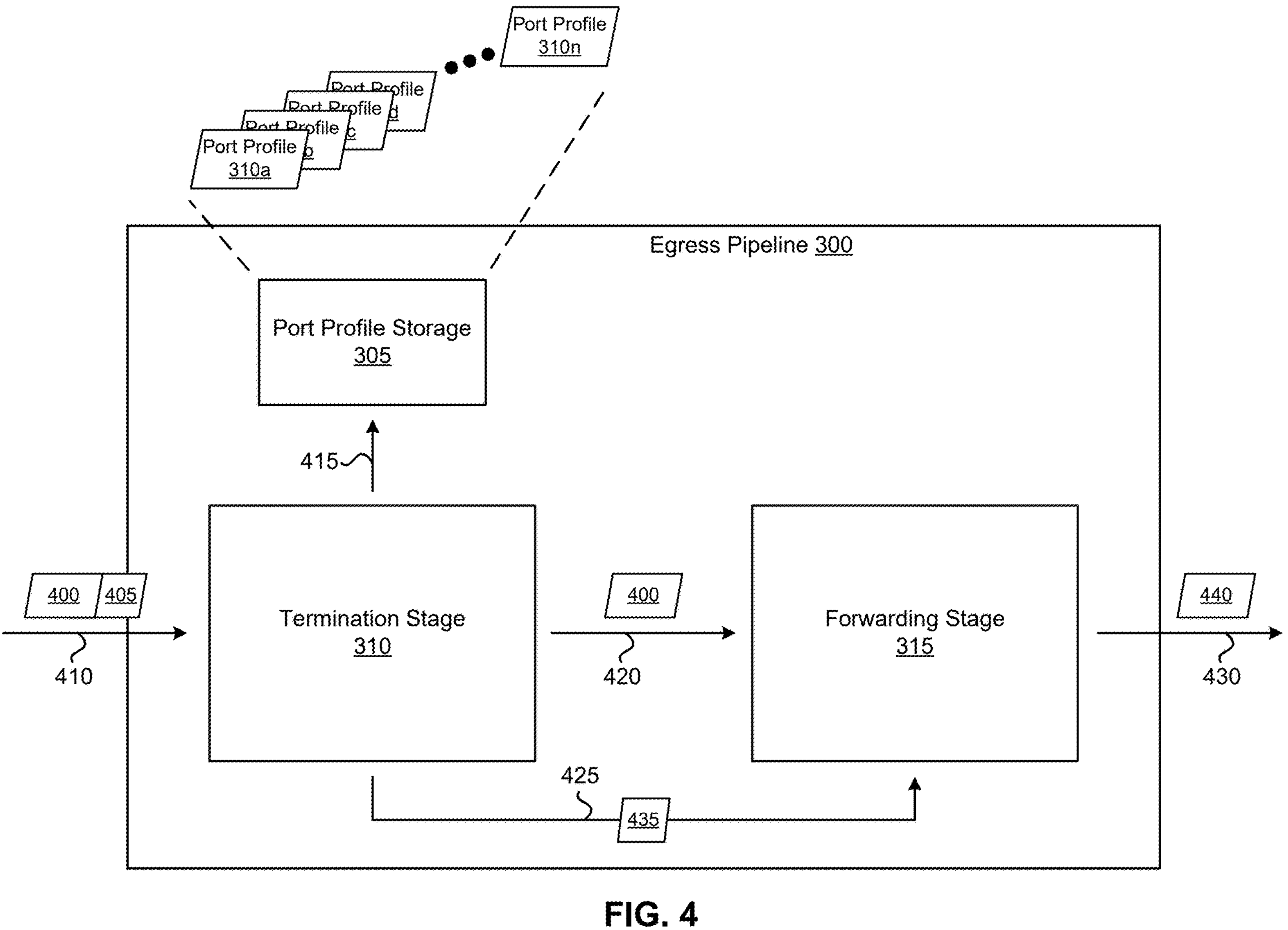
FIG. 4 illustrates an example operation of the egress pipeline illustrated in FIG. 3 according to some embodiments.

Another example operation will now be described by reference to FIG. 4. FIG. 4 illustrates an example operation of egress pipeline 300 according to some embodiments. In particular, FIG. 4 shows how an Ethernet frame is processed through egress pipeline 300. The example operation starts by termination stage 310 receiving, at 410, an Ethernet frame 400 with a set of internal headers 405 prepended to it. In response to receiving Ethernet frame 400 and the set of internal headers 405, termination stage 310 reads the set of internal headers 405 to identify the egress port for Ethernet frame 400 and whether Ethernet frame 400 is a PTP frame. For this example, the egress port for Ethernet frame 400 is port 105*n* and Ethernet frame 400 is a PTP frame. Thus, termination stage 310 accesses, at 415, port profiles storage 305 to read a port profile associated with port 105*n*. In this example, the port profile indicates to bypass MACsec operations. As such, termination stage 310 stores this information in metadata 435 (e.g., a set of bits). Termination stage 310 can store the egress port for Ethernet frame 400 in metadata 435. Next, termination stage 310 sends, at 420, Ethernet frame 400 to forwarding stage 315. Termination stage 310 also sends, at 425, metadata 435 to forwarding stage 315.

Upon receiving Ethernet frame 400 and metadata 435, forwarding stage 315 reads metadata 435 to identify the egress port for Ethernet 400 and information indicating whether to bypass MACsec operations. Here, the information indicates to bypass MACsec operations. Therefore, forwarding stage 315 includes a set of instructions in Ethernet frame 400 indicating so by setting a field in a header of Ethernet frame 400 to a defined value (e.g., the value 0). Next, forwarding stage 315 modifies the destination MAC address of Ethernet frame 400 so Ethernet frame 400 can reach its intended destination. Forwarding stage 315 then sends, at 430, the modified Ethernet frame 400, represented as Ethernet frame 440, to data security engine 120.

Figure 5:
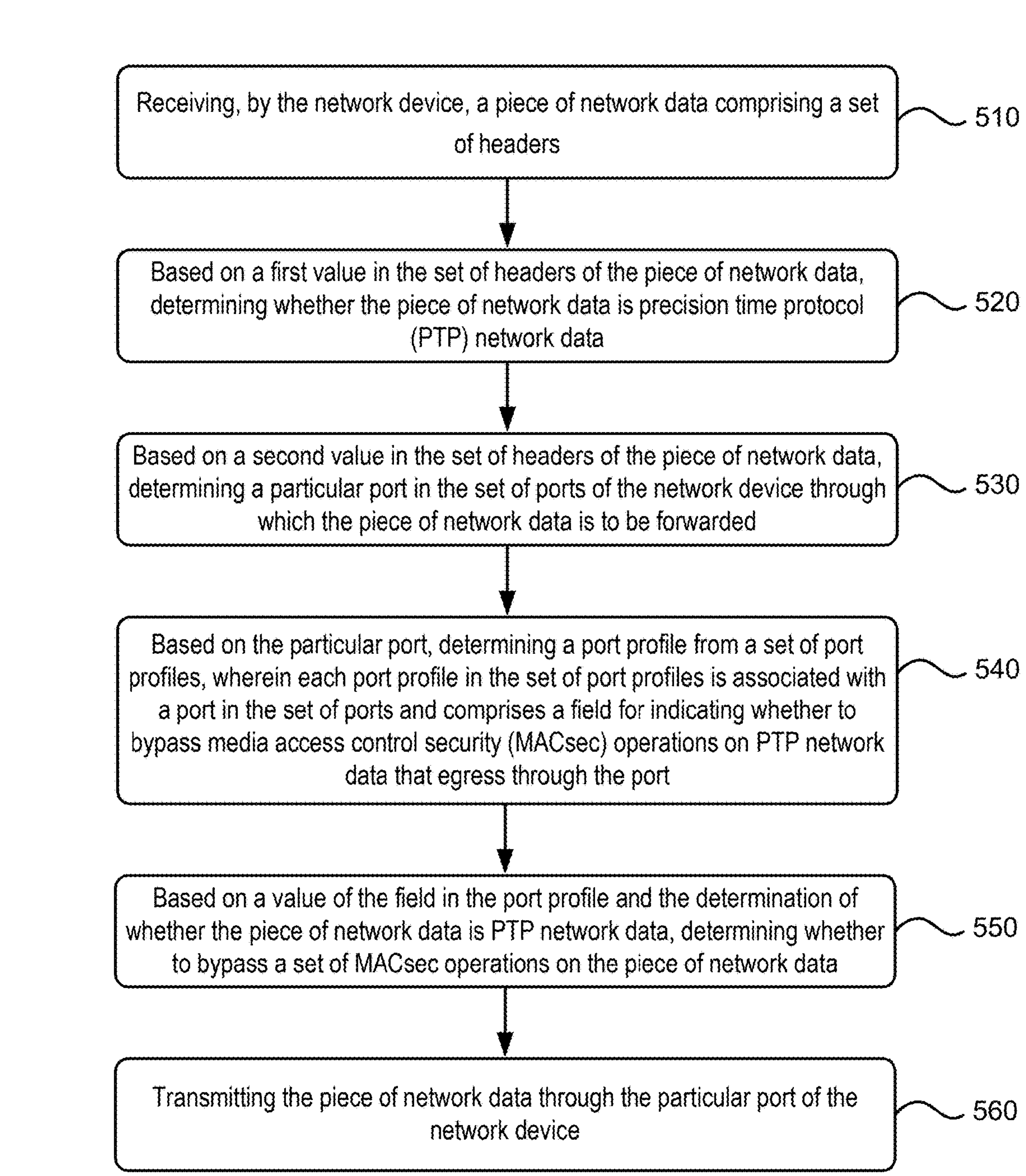
FIG. 5 illustrates a process for providing per port bypassing of data security operations according to some embodiments.

FIG. 5 illustrates a process 500 for providing per port bypassing of data security operations according to some embodiments. In some embodiments, network device 100 performs process 500. Process 500 begins by receiving, at 510, a piece of network data comprising a set of headers. Referring to FIG. 2 as an example, network device 100 can receive Ethernet frame 200 from another network device.

Based on a first value in the set of headers of the piece of network data, process 500 determines, at 520, whether the piece of network data is precision time protocol (PTP) network data. Referring to FIG. 2 as an example, ingress pipeline 110 may determine whether Ethernet 200 is a PTP frame by performing a set of lookups on a set of TCAMs of network device 100 (not shown) to see if the type field of Ethernet frame 200 is a value reserved for PTP (e.g., 0x88F7).

Based on a second value in the set of headers of the piece of network data, process 500 determines, at 530, a particular port in the set of ports of the network device through which the piece of network data is to be forwarded. Referring to FIG. 2 as an example, ingress pipeline 110 determines an egress port for Ethernet frame 200 by parsing and classifying Ethernet frame 200 and determining the forwarding network header of Ethernet frame 200 is an Ethernet header. Hence, ingress pipeline 110 performs a set of lookups on a MAC address table using the destination MAC address in the Ethernet header of Ethernet frame 200 in order to determine the egress port of the bridged packet.

Based on the particular port, process 500 determines, at 540, a port profile from a set of port profiles. Each port profile in the set of port profiles is associated with a port in the set of ports and comprises a field for indicating whether to bypass MACsec operations on PTP network data that egress through the port. Referring to FIG. 2 as an example, egress pipeline 115 reads the set of internal headers 240 to identify the egress port for Ethernet frame 200 and whether Ethernet frame 200 is a PTP frame. As Ethernet frame 200 is a PTP frame in this example, egress pipeline 115 reads a port profile associated with port 105*n*.

Based on a value of the field in the port profile and the determination of whether the piece of network data is PTP network data, process 500 determines, at 550, whether to bypass a set of MACsec operations on the piece of network data. Referring to FIG. 2 as an example, egress pipeline 115 determines to bypass MACsec operations because Ethernet frame 200 is determined to be a PTP frame and the value of the field in the port profile indicates to bypass MACsec operations. Therefore, egress pipeline 115 includes a set of instructions in Ethernet frame 200 indicating so by setting a field in a header of Ethernet frame 200 to a defined value (e.g., the value 0). Egress pipeline 115 then modifies the destination MAC address of Ethernet frame 200 so Ethernet frame 200 can reach its intended destination. Egress pipeline 115 then sends the modified Ethernet frame 200, represented as Ethernet frame 245, to data security engine 120.

Finally, process 500 transmits, at 560, the piece of network data through the particular port of the network device. After data security engine 120 receives Ethernet frame 245 from egress pipeline 115, data security engine 120 reads the set of instructions included in Ethernet frame 245 by reading the value of the field in the header of Ethernet frame 200. For this example, the set of instructions indicates to bypass MACsec operations. Thus, data security engine 120 sends Ethernet frame 245 to PTP processor 125 without performing any MACsec operations on Ethernet frame 245. After receiving Ethernet frame 245, PTP processor 125 performs appropriate PTP operations on Ethernet frame 245 to produce modified Ethernet frame 250. Then, PTP processor 125 forwards Ethernet frame 250 out through port 105*n*.

Figure 6:
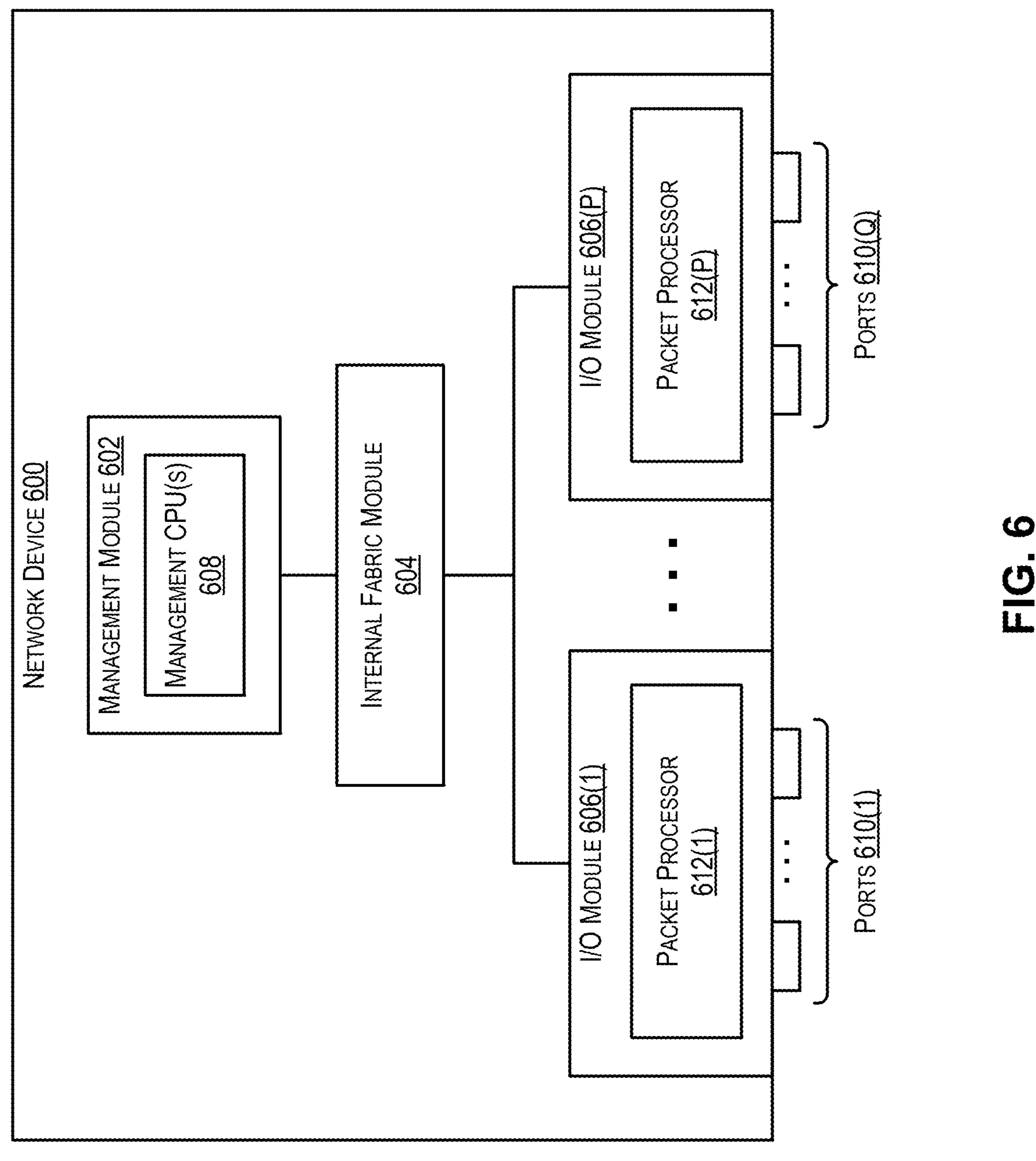
FIG. 6 illustrates an example network device according to some embodiments.

FIG. 6 illustrates the architecture of an example network device (e.g., a network switch or router) 600 that may implement the techniques of the present disclosure according to certain embodiments. For example, network device 600 may be used to implement network device 100 shown in FIGS. 1 and 2.

Network device 600 includes a management module 602, an internal fabric module 604, and a number of I/O modules 606(1)-(P). Management module 602 includes one or more management CPUs 608 for managing/controlling the operation of the device. Each management CPU 608 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 604 and I/O modules 606(1)-(P) collectively represent the data, or forwarding, plane of network device 600. Internal fabric module 604 is configured to interconnect the various other modules of network device 600. Each I/O module 606 includes one or more input/output ports 610(1)-(Q) that are used by network device 600 to send and receive network packets. Each I/O module 606 can also include a packet processor 612, which is a hardware processing component that can make wire speed decisions on how to handle incoming or outgoing network packets.

It should be appreciated that network device 600 is illustrative and other configurations having more or fewer components than network device 600 are possible.

The following are some example embodiments of the present disclosure.

In some embodiments, the techniques described herein relate to a method executable by a network device comprising a set of ports, the method comprising receiving, by the network device, a piece of network data comprising a set of headers; based on a first value in the set of headers of the piece of network data, determining whether the piece of network data is precision time protocol (PTP) network data; based on a second value in the set of headers of the piece of network data, determining a particular port in the set of ports of the network device through which the piece of network data is to be forwarded; based on the particular port, determining a port profile from a set of port profiles, wherein each port profile in the set of port profiles is associated with a port in the set of ports and comprises a field for indicating whether to bypass data security operations on PTP network data that egress through the port; based on a value of the field in the port profile and the determination of whether the piece of network data is PTP network data, determining whether to bypass a set of data security operations on the piece of network data; and transmitting the piece of network data through the particular port of the network device.

In some embodiments, the techniques described herein relate to a method further comprising, upon determining to not bypass the set of data security operations on the piece of network data, performing the set of data security operations on the piece of network data.

In some embodiments, the techniques described herein relate to a method further comprising, upon determining to bypass the set of data security operations on the piece of network data, not performing the set of data security operations on the piece of network data.

In some embodiments, the techniques described herein relate to a method further comprising, after not performing the set of data security operations on the piece of network data, performing a set of PTP operations on the piece of network data.

In some embodiments, the techniques described herein relate to a method, wherein the set of headers is a first set of headers, wherein the network device further comprises an ingress pipeline configured to determine whether the piece of network data is PTP network data based on the first value in the set of headers of the piece of network data, generate a second set of headers, store the determination of whether the piece of network data is PTP network data in the second set of headers, and prepend the second set of headers to the piece of network data In some embodiments, the techniques described herein relate to a method, wherein the ingress pipeline is further configured to determine the particular port of the network device through which the piece of network data is to be forwarded based on the second value in the set of headers of the piece of network data and store the particular port of the network device through which the piece of network data is to be forwarded in the second set of headers to the piece of network data.

In some embodiments, the techniques described herein relate to a method, wherein the network device further comprises an egress pipeline, the method further comprising transmitting the piece of network data from the ingress pipeline to the egress pipeline, wherein the egress pipeline is configured to read the determination of whether the piece of network data is PTP network data from the second set of headers of the piece of network data and determine whether to bypass the set of data security operations on the piece of network data.

In some embodiments, the techniques described herein relate to a method, wherein the egress pipeline comprises a storage, a termination stage, and a forwarding stage, wherein the storage is configured to store a set of port profiles, wherein each port profile in the set of port profiles is for a corresponding port in the set of ports, wherein the termination stage is configured to read the determination of whether the piece of network data is PTP network data from the second set of headers of the piece of network data and read the particular port of the network device through which the piece of network data is to be forwarded from the second set of headers of the piece of network data.

In some embodiments, the techniques described herein relate to a method, wherein the termination stage is further configured to, when the determination of whether the piece of network data is PTP network data indicates that the piece of network data is PTP network data, read, from the storage, the port profile in the set of port profiles associated with the particular port in the set of ports and transmit the piece of network data and the value of the field in the port profile associated with the particular port to the forwarding stage.

In some embodiments, the techniques described herein relate to a method, wherein the network device further comprises a data security processor, wherein the forwarding stage is configured to modify the piece of network data to include a set of instructions indicating whether to bypass the set of data security operations on the piece of network data and transmitting the modified piece of network data to the data security processor.

In some embodiments, the techniques described herein relate to a method, wherein the data security processor is configured to process the piece of network data based on the set of instructions in the piece of network data.

In some embodiments, the techniques described herein relate to a network device comprising a set of ports; a set of processing units; and a non-transitory machine-readable medium storing instructions that when executed by at least one processing unit in the set of processing units cause the at least one processing unit to: receive a piece of network data comprising a set of headers; based on a set of values in the set of headers of the piece of network data, determine whether the piece of network data is precision time protocol (PTP) network data and a particular port in the set of ports of the network device through which the piece of network data is to be forwarded; based on the particular port, determine a port profile from a set of port profiles, wherein each port profile in the set of port profiles is associated with a port in the set of ports and comprises a field for indicating whether to bypass data security operations on PTP network data that egress through the port; based on a value of the field in the port profile and the determination of whether the piece of network data is PTP network data, determine whether to bypass a set of data security operations on the piece of network data; and transmit the piece of network data through the particular port of the network device.

In some embodiments, the techniques described herein relate to a network device, wherein the set of headers is a first set of headers, wherein the network device further comprises an ingress pipeline configured to determine whether the piece of network data is PTP network data based on the set of values in the set of headers of the piece of network data, generate a second set of headers, store the determination of whether the piece of network data is PTP network data in the second set of headers, and prepend the second set of headers to the piece of network data.

In some embodiments, the techniques described herein relate to a network device, wherein the ingress pipeline is further configured to determine the particular port of the network device through which the piece of network data is to be forwarded based on the set of values in the set of headers of the piece of network data and store the particular port of the network device through which the piece of network data is to be forwarded in the second set of headers to the piece of network data.

In some embodiments, the techniques described herein relate to a network device, wherein the network device further comprises an egress pipeline, the method further comprising transmitting the piece of network data from the ingress pipeline to the egress pipeline, wherein the egress pipeline is configured to read the determination of whether the piece of network data is PTP network data from the second set of headers of the piece of network data and determine whether to bypass the set of data security operations on the piece of network data.

In some embodiments, the techniques described herein relate to a network device, wherein the egress pipeline comprises a storage, a termination stage, and a forwarding stage, wherein the storage is configured to store a set of port profiles, wherein each port profile in the set of port profiles is for a corresponding port in the set of ports, wherein the termination stage is configured to read the determination of whether the piece of network data is PTP network data from the second set of headers of the piece of network data and read the particular port of the network device through which the piece of network data is to be forwarded from the second set of headers of the piece of network data.

In some embodiments, the techniques described herein relate to a network device, wherein the termination stage is further configured to, when the determination of whether the piece of network data is PTP network data indicates that the piece of network data is PTP network data, read, from the storage, the port profile in the set of port profiles associated with the particular port in the set of ports and transmit the piece of network data and the value of the field in the port profile associated with the particular port to the forwarding stage.

In some embodiments, the techniques described herein relate to a network device, wherein the network device further comprises a data security processor, wherein the forwarding stage is configured to modify the piece of network data to include a set of instructions indicating whether to bypass the set of data security operations on the piece of network data and transmitting the modified piece of network data to the data security processor.

In some embodiments, the techniques described herein relate to a network device, wherein the data security processor is configured to process the piece of network data based on the set of instructions in the piece of network data.

In some embodiments, the techniques described herein relate to a circuit comprising: a first set of circuits configured to receive a piece of network data comprising a set of headers and, based on a set of values in the set of headers of the piece of network data, determine whether the piece of network data is precision time protocol (PTP) network data and a particular port in the set of ports of the network device through which the piece of network data is to be forwarded;

a second set of circuits configured to, based on the particular port, determine a port profile from a set of port profiles, wherein each port profile in the set of port profiles is associated with a port in the set of ports and comprises a field for indicating whether to bypass data security operations on PTP network data that egress through the port and, based on a value of the field in the port profile and the determination of whether the piece of network data is PTP network data, determine whether to bypass a set of data security operations on the piece of network data; and a third set of circuits configured to transmit the piece of network data through the particular port of the network device.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

The invention claimed is:

1. A method executable by a network device comprising a set of ports, the method comprising:

receiving, by the network device, a piece of network data comprising a set of headers;

based on a first value in the set of headers of the piece of network data, determining whether the piece of network data is precision time protocol (PTP) network data;

based on a second value in the set of headers of the piece of network data, determining a particular port in the set of ports of the network device through which the piece of network data is to be forwarded;

based on the particular port, determining a port profile from a set of port profiles, wherein each port profile in the set of port profiles is associated with a port in the set of ports and comprises a field for indicating whether to bypass data security operations on PTP network data that egress through the port;

based on a value of the field in the port profile and the determination of whether the piece of network data is PTP network data, determining whether to bypass a set of data security operations on the piece of network data; and transmitting the piece of network data through the particular port of the network device.

2. The method of claim 1 further comprising, upon determining to not bypass the set of data security operations on the piece of network data, performing the set of data security operations on the piece of network data.

3. The method of claim 1 further comprising, upon determining to bypass the set of data security operations on the piece of network data, not performing the set of data security operations on the piece of network data.

4. The method of claim 3 further comprising, after not performing the set of data security operations on the piece of network data, performing a set of PTP operations on the piece of network data.

5. The method of claim 1, wherein the set of headers is a first set of headers, wherein the network device further comprises an ingress pipeline configured to determine whether the piece of network data is PTP network data based on the first value in the set of headers of the piece of network data, generate a second set of headers, store the determination of whether the piece of network data is PTP network data in the second set of headers, and prepend the second set of headers to the piece of network data.

6. The method of claim 5, wherein the ingress pipeline is further configured to determine the particular port of the network device through which the piece of network data is to be forwarded based on the second value in the set of headers of the piece of network data and store the particular port of the network device through which the piece of network data is to be forwarded in the second set of headers to the piece of network data.

7. The method of claim 6, wherein the network device further comprises an egress pipeline, the method further comprising transmitting the piece of network data from the ingress pipeline to the egress pipeline, wherein the egress pipeline is configured to read the determination of whether the piece of network data is PTP network data from the second set of headers of the piece of network data and determine whether to bypass the set of data security operations on the piece of network data.

8. The method of claim 7, wherein the egress pipeline comprises a storage, a termination stage, and a forwarding stage, wherein the storage is configured to store a set of port profiles, wherein each port profile in the set of port profiles is for a corresponding port in the set of ports, wherein the termination stage is configured to read the determination of whether the piece of network data is PTP network data from the second set of headers of the piece of network data and read the particular port of the network device through which the piece of network data is to be forwarded from the second set of headers of the piece of network data.

9. The method of claim 8, wherein the termination stage is further configured to, when the determination of whether the piece of network data is PTP network data indicates that the piece of network data is PTP network data, read, from the storage, the port profile in the set of port profiles associated with the particular port in the set of ports and transmit the piece of network data and the value of the field in the port profile associated with the particular port to the forwarding stage.

10. The method of claim 9, wherein the network device further comprises a data security processor, wherein the forwarding stage is configured to modify the piece of network data to include a set of instructions indicating whether to bypass the set of data security operations on the piece of network data and transmitting the modified piece of network data to the data security processor.

11. The method of claim 10, wherein the data security processor is configured to process the piece of network data based on the set of instructions in the piece of network data.

12. A network device comprising:

a set of ports;

a set of processing units; and a non-transitory machine-readable medium storing instructions that when executed by at least one processing unit in the set of processing units cause the at least one processing unit to:

receive a piece of network data comprising a set of headers;

based on a set of values in the set of headers of the piece of network data, determine whether the piece of network data is precision time protocol (PTP) network data and a particular port in the set of ports of the network device through which the piece of network data is to be forwarded;

based on the particular port, determine a port profile from a set of port profiles, wherein each port profile in the set of port profiles is associated with a port in the set of ports and comprises a field for indicating whether to bypass data security operations on PTP network data that egress through the port;

based on a value of the field in the port profile and the determination of whether the piece of network data is PTP network data, determine whether to bypass a set of data security operations on the piece of network data; and transmit the piece of network data through the particular port of the network device.

13. The network device of claim 12, wherein the set of headers is a first set of headers, wherein the network device further comprises an ingress pipeline configured to determine whether the piece of network data is PTP network data based on the set of values in the set of headers of the piece of network data, generate a second set of headers, store the determination of whether the piece of network data is PTP network data in the second set of headers, and prepend the second set of headers to the piece of network data.

14. The network device of claim 13, wherein the ingress pipeline is further configured to determine the particular port of the network device through which the piece of network data is to be forwarded based on the set of values in the set of headers of the piece of network data and store the particular port of the network device through which the piece of network data is to be forwarded in the second set of headers to the piece of network data.

15. The network device of claim 14, wherein the network device further comprises an egress pipeline, wherein the non-transitory machine-readable medium further stores instructions that when executed by the at least one processing unit in the set of processing units cause the at least one processing unit to transmit the piece of network data from the ingress pipeline to the egress pipeline, wherein the egress pipeline is configured to read the determination of whether the piece of network data is PTP network data from the second set of headers of the piece of network data and determine whether to bypass the set of data security operations on the piece of network data.

16. The network device of claim 15, wherein the egress pipeline comprises a storage, a termination stage, and a forwarding stage, wherein the storage is configured to store a set of port profiles, wherein each port profile in the set of port profiles is for a corresponding port in the set of ports, wherein the termination stage is configured to read the determination of whether the piece of network data is PTP network data from the second set of headers of the piece of network data and read the particular port of the network device through which the piece of network data is to be forwarded from the second set of headers of the piece of network data.

17. The network device of claim 16, wherein the termination stage is further configured to, when the determination of whether the piece of network data is PTP network data indicates that the piece of network data is PTP network data, read, from the storage, the port profile in the set of port profiles associated with the particular port in the set of ports and transmit the piece of network data and the value of the field in the port profile associated with the particular port to the forwarding stage.

18. The network device of claim 17, wherein the network device further comprises a data security processor, wherein the forwarding stage is configured to modify the piece of network data to include a set of instructions indicating whether to bypass the set of data security operations on the piece of network data and transmitting the modified piece of network data to the data security processor.

19. The network device of claim 18, wherein the data security processor is configured to process the piece of network data based on the set of instructions in the piece of network data.

20. A circuit comprising:

a first set of circuits configured to receive a piece of network data comprising a set of headers and, based on a set of values in the set of headers of the piece of network data, determine whether the piece of network data is precision time protocol (PTP) network data and a particular port in the set of ports of the network device through which the piece of network data is to be forwarded;

a second set of circuits configured to, based on the particular port, determine a port profile from a set of port profiles, wherein each port profile in the set of port profiles is associated with a port in the set of ports and comprises a field for indicating whether to bypass data security operations on PTP network data that egress through the port and, based on a value of the field in the port profile and the determination of whether the piece of network data is PTP network data, determine whether to bypass a set of data security operations on the piece of network data; and a third set of circuits configured to transmit the piece of network data through the particular port of the network device.

* * * * *